Patented Jan. 10, 1950

2,494,420

UNITED STATES PATENT OFFICE 2,494,420

PROCESS OF UTILIZING ACID SLUDGE

Joseph H. Wells and Philip J. Wilson, Jr., Pittsburgh, Pa., assignors to Carnegie-Illinois Steel Corporation, a corporation of New Jersey No Drawing. Application October 9, 1947, Serial No. 778,758

2 Claims. (Cl. 75—3)

This invention relates to the process of utilizing the acid sludge which is produced as a by-product in the treatment of coke oven light oil, or lower boiling coal tar fractions, with concentrated sulfuric acid, and is a continuation-in-part of our copending application Serial No. 507,884, filed October 27, 1943, now abandoned. The crude light oil obtained from coke oven gas is first distilled to remove the residue. In some cases, the fractionation may include removal of forerunnings boiling below 80° C. The distilled light oil is then washed with two to four per cent by volume of 60° to 66° Bé. sulfuric acid in a vertical, cylindrical tank equipped with a stirrer. The oil and acid are mixed at approximately room temperature until the reaction between the acid and the impurities has proceeded sufficiently far to insure their removal from the oil. Water may then be added in a volume equal to one or two times the volume of sulfuric acid used, but in no case should the amount of water added be such that the concentration of the acid in the agitator tank be reduced below 30% sulfuric acid. The agitation is then stopped and the acid and sludge layers which settle below the oil layer are drawn off. The sludge layer is only slightly soluble in and separates quite rapidly from sulfuric acid solutions greater in strength than 30% sulfuric acid. The sludge contains unsaturated and sulfur compounds from the oil which condense, polymerize, and otherwise react with themselves and with the sulfuric acid to produce a reddish brown, resinous, sticky mass, which is often rather viscous. Mixed with this mass is a large proportion of sulfuric acid which, although it has promoted the other reactions, has still not itself reacted. The sludge also contains a certain proportion of the oil entrained or dissolved in it.

The above description indicates that this acid sludge is a material which is difficult to handle and which presents substantial disposal problems. A number of processes have been developed for recovering the free sulfuric acid which it contains. In some of these processes the sludge is heated, which causes the organic matter to polymerize or coagulate and to rise to the top of the resulting dilute sulfuric acid solution as a highly viscous, black pitch. The acid is drained away and the pitch is discarded by whatever means are least objectionable, which is usually on a dump or by burning.

In other processes, the sludge is neutralized with an alkali, such as ammonia, which reacts with the acid to produce ammonium sulfate. The organic matter dissolves in the neutralized salt solution, and must be separated therefrom in some way before a satisfactory ammonium sulfate fertilizer can be produced.

Attempts to utilize the organic matter in the acid sludge have been made. Its resinous character has led to suggestions for its use as a binder, such as in the production of briquettes of ore or fuel. However, the high viscosity makes coating the solid surfaces with a thin, uniform film, very difficult, and a large amount of the organic matter is required.

Acid sludge from the refining of petroleum fractions have been used as a binder in the manner described in the patents to Goodwin No. 1,749,378, dated March 4, 1930, Johnston et al. No. 1,655,728, dated January 10, 1928, Humphreys et al, No. 1,474,933, dated November 20, 1923, and in the book by Stillman, published in 1923, entitled "Briquetting." However, we have found that the properties of the two types of acid sludge are so different that the same methods of utilization are not applicable. Petroleum acid sludge is thermoplastic and asphaltic in character. Coke oven light oil acid sludge is not asphaltic nor thermoplastic and it will, when heated, form pitch and will char, but will not melt or soften, while petroleum acid sludge will melt or soften. The coke oven acid sludge is thinnable with water, but will form a coke-like mass when heated to a temperature below 100° C.

The present invention is based upon the discovery that the resinous organic matter, which is referred to hereinafter by the term "acid resin," in the sludge may be utilized successfully as a binder for various types of solids when it is handled in the following manner:

The acid sludge is discharged as produced into a separator or decanter, and allowed to remain therein until the acid resin has separated into a layer above the aqueous solution of sulfuric acid. Small amounts of acid resin may be entrained or dissolved in the acid, and vice versa. The two layers are separated, and the acid layer may be heated to separate any acid resin left. The small amount of pitch thus produced is discarded since the character of the acid resin is so altered by the heating operation that it is no longer of value for the purpose of this invention.

After decantation, the acid resin is thinned with water so that it will flow readily and produce a uniform, thin film on a solid surface. The volume of water used may amount to one or two times the volume of acid resin, or even more. In case the acid in the acid resin injures the solids, a neutralizing agent may be added at this stage. The acid resin solution then is applied to the solid surfaces, either by mixing the two together, or by spraying, or distributing it in any other manner. The coated materials are pressed together firmly, and as a final step, the moisture is evaporated by heating or by exposure to the atmosphere.

The process may be operated either continuously or as a batch process; or certain portions may be continuous and the balance batch.

The utilization of acid resin is exemplified in the briquetting of flue dust recovered during operation of a blast furnace producing ferro-manganese. Such flue dust contains considerable manganese, so that it may not be discarded, in view of the strategic importance of manganese. Such dust cannot be recharged into the furnace, because a large portion would be blown out from the furnace a second time, and also because such dust might interfere with furnace operation.

While flue dust from a blast furnace using iron ore may be sintered, that from a ferro-manganese furnace will not sinter. However, it is found in accordance with the present invention, that the acid resin produced from the acid sludge by the present process can be utilized to produce briquettes of this fine ferro-manganese dust of sufficient strength for recharging into the furnace. Also, it is found by controlling the proportions of materials, that alkali in the flue dust will neutralize the acid in the binder, and the resulting briquettes will not corrode steel equipment when wetted.

The following table shows tests on the production of briquettes of approximately 2.5 centimeters in diameter by 1.1 centimeters high, containing different proportions of binder. The flue dust from the dry dust catcher of a ferro-manganese furnace was pugged with the binder until uniformly wetted, the mixture compressed into briquettes, and the latter finally baked at 100° C. for 1.5 hours. After cooling, the briquettes were tested for compression in an Amsler testing machine.

| Acid Resin from Acid Sludge in Aqueous Binder Solution, per cent by volume | Pounds of Binder per Pound Flue Dust | Pounds of Acid Resin from Sludge per Pound Flue Dust | Character of Flue Dust and Binder Mix | Compressive Strength of Finished Briquette, lbs. per sq. in. |
|---|---|---|---|---|
| 50 | .25 | .125 | damp | 4,400 |
| 33 | .22 | .073 | do | 4,330 |
| 25 | .21 | .053 | do | 3,740 |
| 50 | .31 | .165 | wet | 4,500 |
| 50 | .45 | .225 | do | 4,650 |

The above table shows that it is possible to secure briquettes of excellent strength by the use of acid resins highly thinned with water. The strength of the briquettes is not a function of the quantity of binder, and excellent briquettes may be produced by the use of very small amounts of acid resin as long as the resin is completely and uniformly distributed over the surface.

The briquettes withstood heating to a red heat without disintegrating or losing their shape, which is advantageous for their subsequent exposure to high temperatures and severe mechanical action which are present in the blast furnace.

The acid resin can be used in a similar manner for preparation of briquettes from coal, coke, sawdust, and other solids and for other adhesive purposes.

We claim:

1. The process of preparing briquettes of blast furnace flue dust, which comprises combining with flue dust a resinous acid sludge obtained by treating coke oven light oil with 60° to 66° Bé. sulfuric acid, allowing the resulting sludge and acid to settle into layers, separating the sludge from the acid, thinning the said sludge with at least an equal amount of water until it flows readily and adding the resulting thinned sludge to the flue dust and mixing therewith thereby producing a uniform, thin film on the thinned sludge of the said flue dust, thereafter pressing the resulting coated material firmly together, and evaporating the moisture contained therein.

2. The process as claimed in claim 1, wherein the flue dust to be briquetted is flue dust from a blast furnace producing ferro-manganese.

JOSEPH H. WELLS.
PHILIP J. WILSON, JR.

REFERENCES CITED

The following references are of record in the file of this patent:

UNITED STATES PATENTS

| Number | Name | Date |
|---|---|---|
| 987,554 | Coggeshall | Mar. 21, 1911 |
| 1,059,150 | Haage | Apr. 15, 1913 |
| 1,521,283 | Diggs | Dec. 30, 1924 |
| 1,655,728 | Johnston et al. | Jan. 10, 1928 |
| 1,680,107 | Marquard | Aug. 7, 1928 |
| 1,749,378 | Goodwin | Mar. 4, 1930 |
| 1,872,463 | Jones | Aug. 16, 1932 |
| 2,164,950 | Schulze | July 4, 1939 |

OTHER REFERENCES

"Briquetting" by Stillman, published by the Chemical Publishing Co., 1923, page 402.